United States Patent
Chen et al.

(10) Patent No.: US 10,708,744 B2
(45) Date of Patent: Jul. 7, 2020

(54) NFC-BASED COMMUNICATION METHOD AND APPARATUS

(71) Applicant: CHINA UNIONPAY CO., LTD., Shanghai (CN)

(72) Inventors: Chengqian Chen, Shanghai (CN); Yu Zhou, Shanghai (CN); Wei Guo, Shanghai (CN)

(73) Assignee: CHINA UNIONPAY CO., LTD., Pudong New Area, Shanghai (CN)

( * ) Notice: Subject to any disclaimer, the term of this patent is extended or adjusted under 35 U.S.C. 154(b) by 0 days.

(21) Appl. No.: 15/570,282

(22) PCT Filed: Apr. 20, 2016

(86) PCT No.: PCT/CN2016/079708
§ 371 (c)(1),
(2) Date: Oct. 27, 2017

(87) PCT Pub. No.: WO2016/173434
PCT Pub. Date: Nov. 3, 2016

(65) Prior Publication Data
US 2018/0139596 A1      May 17, 2018

(30) Foreign Application Priority Data

Apr. 30, 2015   (CN) .......................... 2015 1 0215296

(51) Int. Cl.
*H04W 4/80*        (2018.01)
*H04B 5/00*        (2006.01)
(Continued)

(52) U.S. Cl.
CPC ............ *H04W 4/80* (2018.02); *G06F 21/606* (2013.01); *G06F 21/74* (2013.01); *H04B 5/00* (2013.01);
(Continued)

(58) Field of Classification Search
CPC ........................................................ H04B 5/00
See application file for complete search history.

(56) References Cited

U.S. PATENT DOCUMENTS

2007/0263596 A1* 11/2007 Charrat ................... H04L 45/00
                                                                      370/351
2014/0337920 A1* 11/2014 Giobbi .................... G06F 21/44
                                                                       726/3
(Continued)

FOREIGN PATENT DOCUMENTS

CN      103793815 A      5/2014
CN      104143996 A     11/2014

OTHER PUBLICATIONS

International Search Report corresponding to international application No. PCT/CN2016/079708, dated Jul. 4, 2016 (English translation).

Primary Examiner — Hsinchun Liao
(74) Attorney, Agent, or Firm — Marshall, Gerstein & Borun LLP

(57) ABSTRACT

The invention provides communication method and apparatus based on NFC, and in particular, to communication method and apparatus based on NFC in a security element (SE), a communication method based on NFC in a smart terminal, a security element and a smart terminal. The invention proposes a new way of connection with the NFC device so that the TEE applications can have NFC ability.

11 Claims, 3 Drawing Sheets

(51) Int. Cl.
*G06F 21/74* (2013.01)
*H04W 4/60* (2018.01)
*G06F 21/60* (2013.01)
*H04W 12/00* (2009.01)
*G06Q 20/32* (2012.01)

(52) U.S. Cl.
CPC ............ *H04W 4/60* (2018.02); *H04W 12/00* (2013.01); *H04W 12/003* (2019.01); *G06Q 20/32* (2013.01)

(56) References Cited

U.S. PATENT DOCUMENTS

2015/0044995 A1    2/2015   Chastain et al.
2015/0244718 A1*   8/2015   Smets ................ H04L 63/0861
                                                                             726/7

* cited by examiner

NFC-BASED COMMUNICATION METHOD AND APPARATUS

CROSS REFERENCE TO RELATED APPLICATIONS

This application is the U.S. national phase of PCT Application No. PCT/CN2016/079708, filed on Apr. 20, 2016, which claims priority to Chinese Patent Application No. 201510215296.3, filed on Apr. 30, 2015, the entire disclosures of which are hereby incorporated by reference in their entirety.

FIELD OF THE INVENTION

The invention relates to communication method and apparatus based on NFC, and in particular, to communication method and apparatus based on NFC in a security element (SE), a communication method based on NFC in a smart terminal, a security element and a smart terminal.

BACKGROUND

The trusted execution environment (TEE) technology can provide a trusted execution environment/operating system that are protected in hardware isolation for smart terminals such as mobile phones or the like. Security-related applications on the smart terminal, i.e., TEE application, can be executed on TEE so as to ensure the security.

Near field communication (NFC) is a short-range wireless communication technology, which is based on radio frequency identification (RFID) technology and uses magnetic filed induction to realize a short-range communication between smart terminals.

Typically, the NFC function is realized in a rich execution environment (REE) such as Android, IOS or the like for the applications in REE. When the TEE applications require that the NFC function be realized, the following technical solutions exist.

The NFC function of TEE applications is realized through service proxy in the REE, as shown in FIG. 1. This solution takes advantage of the ability of connecting REE and NFC device in the smart terminal so as to set the NFC service proxy in the REE to provide NFC ability for TEE applications. Herein, the NFC apparatus can be a NFC controller, which is for example a NFC chip disposed in the smart terminal. The NFC service proxy in REE shown in FIG. 1 and a NFC client disposed in the TEE realize the NFC function of TEE applications based on a predetermined protocol. Specifically, the NFC service proxy receives a message from the TEE application via the NFC client, and invokes a NFC protocol stack to operate the NFC device to execute specific NFC functions, such as functions of card simulating, card reader, etc. Since data interaction between TEE applications and NFC devices has to go through insecure REE, it is difficult for the TEE applications to be executed safely. For example, for transaction applications in TEE, payment information transmitted via REE may be stole.

In other solutions, by setting NFC drive in TEE and realizing NFC protocol stack, the NFC ability is provided to TEE applications, as shown in FIG. 2. In order to make NFC functions of REE applications be compatible, this solution requires that a NFC virtual drive be additionally provided in the REE so as to dock with an actual NFC drive in the TEE. Since the NFC drive in the TEE is required to coordinate communications among NFC protocol stack, NFC virtual drive and NFC device, the complexity of TEE will be inevitably be increased. On the other hand, since REE core does not contain NFC virtual drive, changing the original NFC drive of REE core into NFC virtual drive will also increase the complexity of REE; in particular, with the addition of new NFC devices and the update of NEE core, an independent maintenance is required for the NFC virtual drive.

SUMMARY OF THE INVENTION

The invention proposes a new communication architecture based on NFC, which uses new connection path so that the TEE applications have NFC ability. The invention uses a security element (SE) as communication media between TEE applications and NFC devices so as to realize the NFC ability of TEE applications. Herein, SE is an independent module (such as SIM card, smart SD card, etc.) which has computing and storage functions, and which provide a security mechanism to protect the security of data stored therein and communication with external devices. Communication between SE and NFC devices can be conducted via a host controller interface (HCI) based on single wire protocol (SWP). Communication between SE and TEE can be conducted via an interface supported by SE (e.g. 7816 interface, SPI interface).

The invention discloses the following technical solutions.

A communication method based on NFC in SE, comprising: receiving a first message from a communication module in TEE; forwarding the first message to a NFC device; receiving a second message from the NFC device; and forwarding the second message to the communication module.

Preferably, the method comprises a process of establishing a communication channel between TEE applications and the NFC device, in which a channel establishment command originating from the application is received by the communication module, and is forwarded to the NFC device; a return message comprising a channel number which is used for identifying the application is received from the NFC device, and is forwarded to the communication module.

Preferably, the method comprises a process of data interaction between the applications and the NFC device, in which a message comprising the channel number and interactive data originating from a NFC communication entity is received from the NFC device, and is forwarded to the communication module, the channel number being used for the communication module to determine the application; a response message for the NFC communication entity originating from the application is received from the communication module, and is forwarded to the NFC device.

Preferably, message transmission with the communication module and message transmission with the NFC device use the same communication protocol.

A communication apparatus based on NFC in SE, comprising: a first module for receiving a first message from a communication module in TEE; a second module for forwarding the first message to a NFC device; a third module for receiving a second message from the NFC device; and a fourth module for forwarding the second message to the communication module.

Preferably, the apparatus is configured to establish a communication channel between TEE applications and the NFC device, wherein the first module is configured to receive a channel establishment command originating from the application from the communication module, the second module is configured to forward the channel establishment command to the NFC device, the third module is configured to receive a return message comprising a channel number for identifying the application from the NFC device, and the fourth module is configured to forward the return message comprising he channel number to the communication module.

Preferably, the apparatus is further configured to receive and transmit interactive data between the applications and the NFC device, wherein the third module is configured to receive a message comprising the channel number and interactive data from the NFC device, the interactive data originating from a NFC communication entity; the fourth module is configured to forward the message comprising the channel number and the interactive data to the communication module, the channel number being used for the communication module to determine the application; the first module is configured to receive a response message for the NFC communication entity originating from the application from the communication module; and the second module is configured to forward the response message to the NFC device.

Preferably, message transmission with the communication module and message transmission with the NFC device use the same communication protocol.

A communication method based on NFC in a smart terminal, comprising: sending a first message to a NFC device via SE and receiving a second message from the NFC device via the SE, when the smart terminal is operating in TEE.

Preferably, the method comprises a process of establishing a communication channel between TEE applications and the NFC device, in which a channel establishment command originating from the application is sent to the NFC device via the SE, and a return message comprising a channel number which is used for identifying the application is received from the NFC device via the SE.

Preferably, the method comprises a process of data interaction between the applications and the NFC device, in which a message comprising the channel number and interactive data originating from a NFC communication entity is received from the NFC device via the SE, the application is determined according to the channel number, and a response message for the NFC communication entity is sent to the NFC device via the SE.

Preferably, message communication with the SE is based on a communication protocol between the SE and the NFC devices.

A communication apparatus based on NFC in a smart terminal, which is configured to send a first message to a NFC device via SE and to receive a second message from the NFC device via the SE, when the smart terminal is operating in TEE.

Preferably, the apparatus is configured to establish a communication channel between TEE applications and the NFC device, and the apparatus is further configured to send a channel establishment command originating from the application to the NFC device via the SE, and to receive a return message comprising a channel number which is used for identifying the application from the NFC device via the SE.

Preferably, the apparatus is configured to realize data interaction between the applications and the NFC device, and the apparatus is further configured to receive a message comprising the channel number and interactive data originating from a NFC communication entity from the NFC device via the SE, to determine the application according to the channel number, and to send a response message for the NFC communication entity to the NFC device via the SE.

Preferably, the apparatus is configured to communicate messages with the SE based on a communication protocol between the SE and the NFC devices.

BRIEF DESCRIPTION OF THE DRAWINGS

Those skilled in the art will understand the invention more clearly after reading specific embodiments of the invention with reference to the accompanying drawings. It should be understood by those skilled in the art that the drawings are merely used for illustrating the technical solutions of the invention in conjunction with the specific embodiments, instead of limiting the scope of protection of the invention.

DETAILED DESCRIPTION OF THE INVENTION

Specific embodiments of the invention will be further described below in detail with reference to the accompanying drawings. It should be understood that the embodiments described below can be modified in terms of structure and function. Moreover, one or more features of one embodiment can be combined with one or more features of another embodiment for any given or particular application.

Figure 1:
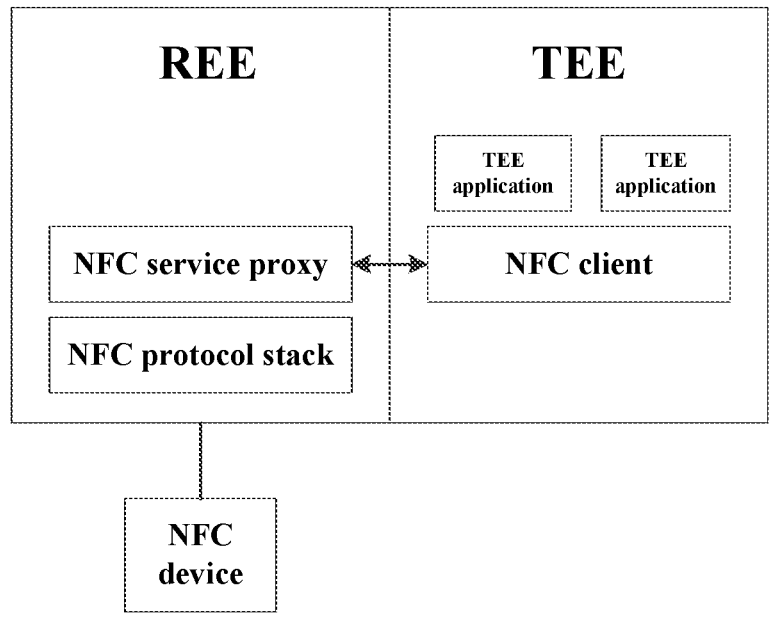
FIG. 1 is a block diagram showing the realization of NFC function of TEE application through service proxy in REE.
Figure 2:
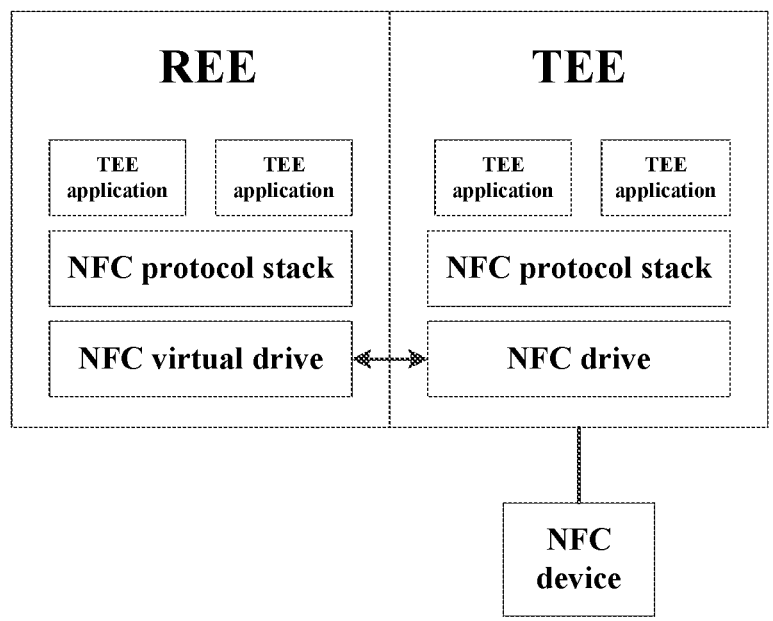
FIG. 2 is a block diagram showing providing NFC ability for TEE applications by setting NFC drive in TEE and realizing NFC protocol stack.
Figure 3:
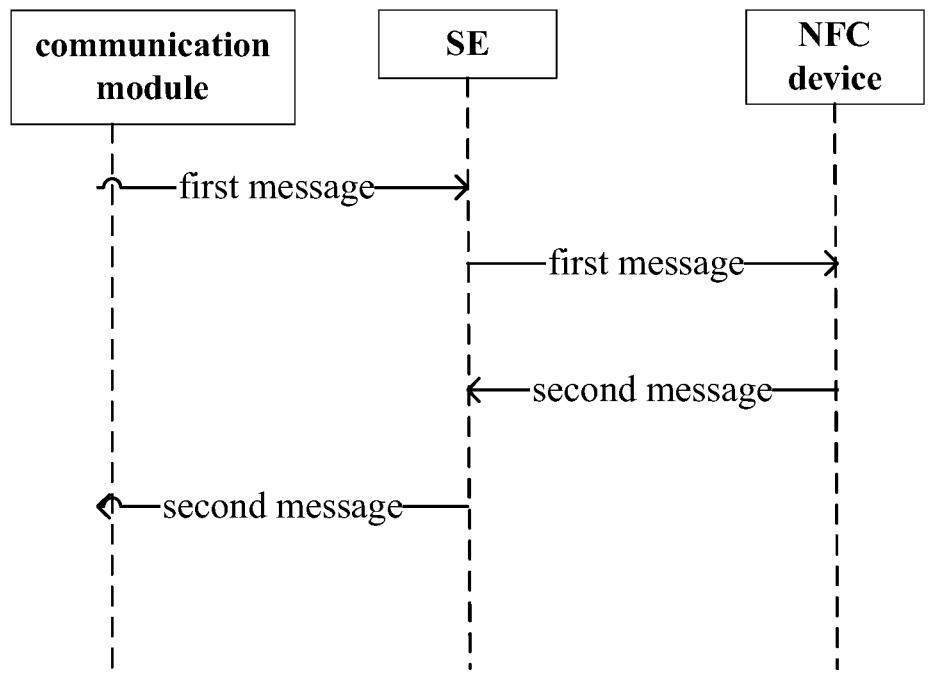
FIG. 3 is a schematic view showing message transmission of a communication method based on NFC in SE according to an embodiment.

FIG. 3 is a schematic view showing message transmission of a communication method based on NFC in SE according to an embodiment. As shown in FIG. 3, the communication method comprises the following steps: receiving a first message from a communication module in TEE by SE; forwarding the first message to a NFC device by SE; receiving a second message from the NFC device by SE; and forwarding the second message to a communication module by SE. Herein, the first message originates from a TEE application, and the second message can originate from the NFC device or an external NFC communication entity (e.g., a POS terminal, a mobile communication terminal). Through the above steps, data interaction between the TEE application and the NFC device does not go through insecure REE, and TEE applications can be executed safely.

Preferably, message transmission between SE and the communication module and message transmission between SE and the NFC device can use the same communication protocol, e.g., HCI protocol. Since the HIC protocol between SE and the NFC device is not complicated, implementing a HIC protocol stack in TEE will not increase the complexity of TEE.

Figure 4:
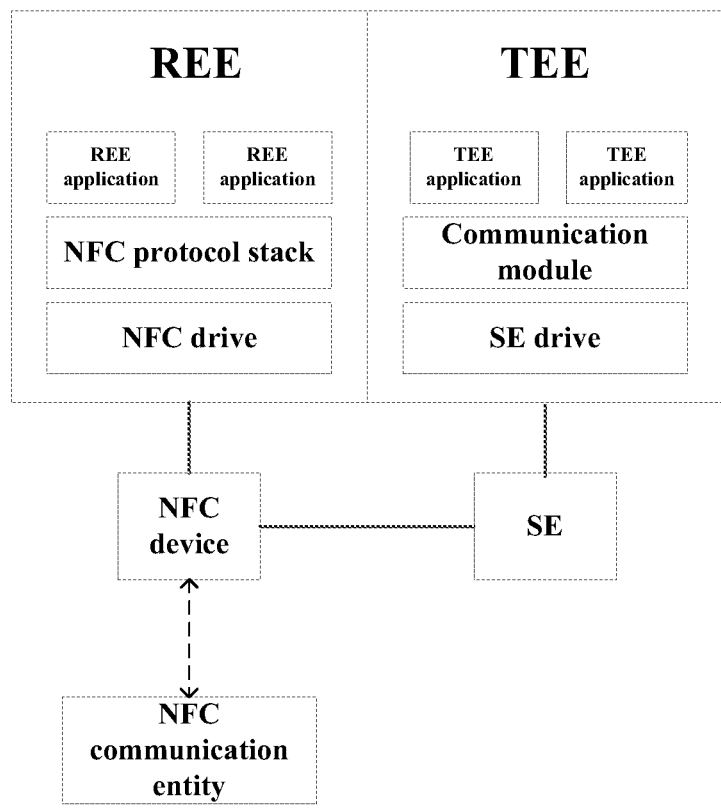
FIG. 4 is a schematic view showing the communication module, SE and NFC in FIG. 3.

Reference is now made to FIG. 4, which shows a schematic view of the communication module, SE and NFC device in FIG. 3. As shown in FIG. 4, the communication module is disposed in a smart terminal that can run two operating systems of REE and TEE, the NFC device can be disposed in the smart terminal or attached to the smart terminal, and SE can be disposed in the smart terminal or attached to the smart terminal. TEE applications are coupled with the communication module, and a SE drive is used to interact with SE via the communication module. The NFC device also interacts with a NFC communication entity. As such, an interaction between TEE applications and the NFC communication entity is realized via SE.

With continued reference to FIG. 4, the communication module is used for realizing the HCI protocol stack so that a message originating from the TEE application is contained in a data packet by the communication module according to HCI protocol so as to be sent to SE. Likewise, the communication module receives the data packet according to HCI protocol from the SE, obtains a message for the TEE application from the data packet, and then sends the message to TEE application. Since the communication information is transmitted through a communication path of a trusted environment formed by TEE, SE and the NFC device, TEE applications are be executed safely.

Now the communication path among the communication module, SE and the NFC device is described. As described above, the communication module comprising the HCI protocol stack is disposed in TEE. As such, the transmission according to HCI protocol message between SE and TEE can be conducted via an application protocol data unit (APDU) channel between SE and TEE. The transmission according to HCI protocol message between SE and the NFC device can be conducted via a SWP channel between SE and the NFC device.

The process of establishing the communication channel between TEE application and the NFC device will be described below. Again, with reference to FIG. 3, in this process, a channel establishment command originating from the application is received from the communication module as a first message, and is forwarded to the NFC device; a return message comprising a channel number is received from the NFC device as a second message, and is forwarded to the communication module, wherein the channel number is used for identifying the application.

An example is given below:

(1) the TEE application generates the channel establishment command, and specifies an interface for the NFC device;

(2) the communication module converts the channel establishment command into a HCI data packet, and sends the HCI data packet to a HCI module of SE via the APDU channel;

(3) the HCI module of SE receives the HCI data packet, converts it into a SWP data packet, and sends it to the NFC device via the SWP channel;

(4) the HCI module of the NFC device receives the HCI data packet, processes the channel establishment command in the data packet so as to generate a channel number, and then returns the message comprising the channel number to SE in a format of HCI data packet;

(5) the HCI module of SE resolves the HCI data packet to obtain the channel number therein, records a correspondence of the channel number and the TEE application in a channel table, and then sends the HCI data packet to TEE via the APDU channel;

(6) the communication module of TEE resolves the HCI data packet to obtain the channel number therein, records a correspondence of the channel number and the TEE application. As such, the establishment of the communication channel between the TEE applications and the NFC device is completed.

Figure 5:
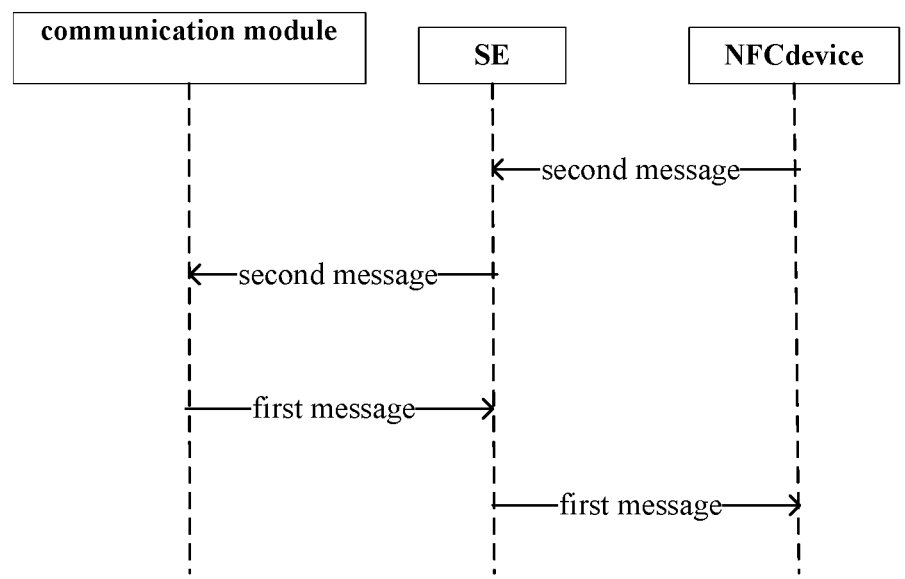
FIG. 5 is a schematic view showing message transmission of a communication method based on NFC in SE according to an embodiment.

Upon completion of the establishment of the channel, the smart terminal can start an interaction with the NFC communication entity. The process for realizing data interaction between the application and the NFC device will be described below. With reference to FIG. 5, a schematic view of message transmission of a communication method based on NFC in SE according to an embodiment is shown. In this process, a message comprising the channel number and interactive data originating from the NFC communication entity is received from the NFC device as a second message, and is forwarded to the communication module, the channel number being used for the communication module to determine the application; a response message for the NFC communication entity originating from the application is received from the communication module as a first message, and is forwarded to the NFC device.

An example is given below:

(1) the NFC device obtains interactive data from the NFC communication entity, and sends the interactive data to SE in a format of HCI data packet;

(2) the SE resolves the HCI data packet to obtain the channel number therein, and determines whether the channel number corresponds to the TEE application or the SE application according to the channel table; if it corresponds to the SE application, the interactive data is sent to a specific application on SE; and if it corresponds to the TEE application, the HCI data packet is sent to the communication module in the TEE via the APDU channel;

(3) the communication module of TEE resolves the HCI data packet so as to obtain the interactive data, finds the specified TEE application according to the channel number therein, and sends the interactive data to the TEE application.

In this way, TEE uses the NFC device and SE to complete data reception and transmission with the external NFC communication entity. It should be understood that the specific ability of NFC can be used according to a specific command, including the abilities of card simulating, card reader, etc.

Again, with reference to FIG. 4, in this embodiment, the NFC device is connected with REE and is controlled by REE. The NFC device maintains the original implementation architecture and function, and REE also controls the NFC device in the original way and provides the NFC ability for REE applications. Therefore, this solution does not require any modification to REE and the NFC device in terms of software or hardware.

From the above description of embodiments, those skilled in the art can understand that various modifications and replacements can be also made to the specific embodiments of the invention without departing from the spirit and scope of the invention, which will also fall within the scope defined by the appended claims of the invention.

The invention claimed is:

1. A communication method based on near field communication (NFC) in a security element (SE), comprising:
    receiving a first message from a communication module in a trusted execution environment (TEE) system of a smart terminal, wherein an SE drive in the TEE system is used to interact with the SE via the communication module;
    forwarding the first message to a NFC device connected with and controlled by a rich execution environment (REE) system of the smart terminal;
    receiving a second message from the NFC device;
    forwarding the second message to the communication module; and, establishing a communication channel between a TEE application and the NFC device, in which:
a channel establishment command originating from the TEE application is received by the communication module,
the channel establishment command is forwarded to the NFC device,
a return message comprising a channel number which is used for identifying the TEE application is received from the NFC device, and
the return message comprising the channel number is forwarded to the communication module,
wherein message transmission with the communication module and message transmission with the NFC device use the same communication protocol.

2. The communication method according to claim 1, further comprising performing a process of data interaction between the TEE application and the NFC device, in which:
a message comprising the channel number and interactive data originating from a NFC communication entity is received from the NFC device;
the message comprising the channel number and interactive data is forwarded to the communication module, the channel number being used for the communication module to determine the TEE application;
a response message for the NFC communication entity originating from the application is received from the communication module; and
the response message is forwarded to the NFC device.

3. A communication apparatus based on near field communication (NFC) in a security element (SE), comprising:
a first module for receiving a first message from a communication module in a trusted execution environment (TEE) system of a smart terminal, wherein an SE drive in the TEE system is used to interact with the SE via the communication module;
a second module for forwarding the first message to a NFC device connected with and controlled by a rich execution environment (REE) system of the smart terminal;
a third module for receiving a second message from the NFC device; and
a fourth module for forwarding the second message to the communication module,
wherein message transmission with the communication module and message transmission with the NFC device use the same communication protocol.

4. The communication apparatus according to claim 3, wherein the apparatus is configured to establish a communication channel between TEE applications and the NFC device, wherein:
the first module is configured to receive a channel establishment command originating from the application from the communication module;
the second module is configured to forward the channel establishment command to the NFC device;
the third module is configured to receive a return message comprising a channel number for identifying the application from the NFC device; and
the fourth module is configured to forward the return message comprising the channel number to the communication module.

5. The communication apparatus according to claim 4, wherein the apparatus is further configured to receive and transmit interactive data between the applications and the NFC device, wherein:

the third module is configured to receive a message comprising the channel number and interactive data from the NFC device, the interactive data originating from a NFC communication entity;
the fourth module is configured to forward the message comprising the channel number and the interactive data to the communication module, the channel number being used for the communication module to determine the application;
the first module is configured to receive a response message for the NFC communication entity originating from the application from the communication module; and
the second module is configured to forward the response message to the NFC device.

6. A security element comprising the apparatus according to claim 3.

7. A communication method based on near field communication (NFC) in a smart terminal, comprising:
sending a first message to a NFC device connected with and controlled by a rich execution environment (REE) system of the smart terminal via a security element (SE) and receiving a second message from the NFC device via the SE, when the smart terminal is operating in a trusted execution environment (TEE) system,
further comprising establishing a communication channel between a TEE application and the NFC device, in which:
a channel establishment command originating from the TEE application is sent to the NFC device via the SE, and
a return message comprising a channel number which is used for identifying the TEE application is received from the NFC device via the SE,
wherein message communication with the SE is based on a communication protocol between the SE and the NFC device, and wherein
an SE drive in the TEE system is used to interact with the SE via the communication module.

8. The communication method according to claim 7, further comprising performing a process of data interaction between the TEE application and the NFC device, in which:
a message comprising the channel number and interactive data originating from a NFC communication entity is received from the NFC device via the SE;
the application is determined according to the channel number; and
a response message for the NFC communication entity is sent to the NFC device via the SE.

9. A communication apparatus based on near field communication (NFC) in a smart terminal, wherein the communication apparatus is configured to:
send a first message to a NFC device connected with and controlled by a rich execution environment (REE) system of the smart terminal via a security element (SE) and to receive a second message from the NFC device via the SE, when the smart terminal is operating in a trusted execution environment (TEE) system, and wherein an SE drive in the TEE system is used to interact with the SE via a communication module;
wherein the apparatus is configured to establish a communication channel between a TEE application and the NFC device, and the apparatus is further configured to:
send a channel establishment command originating from the application to the NFC device via the SE; and receive a return message comprising a channel number which is used for identifying the application from the NFC device via the SE, wherein the apparatus is configured to communicate messages with the SE based on a communication protocol between the SE and the NFC device.

10. The communication apparatus according to claim 9, wherein the apparatus is configured to realize data interaction between the applications and the NFC device, and the apparatus is further configured to:

receive a message comprising the channel number and interactive data originating from a NFC communication entity from the NFC device via the SE;

determine the application according to the channel number; and send a response message for the NFC communication entity to the NFC device via the SE.

11. A smart terminal comprising the apparatus according to claim 9.

* * * * *